(12) United States Patent
Hung

(10) Patent No.: US 6,300,742 B1
(45) Date of Patent: Oct. 9, 2001

(54) INTELLIGENT CAR BATTERY-CHARGING CABLE DEVICE

(76) Inventor: Kuang-Fu Hung, No. 1, Alley 6, Lane 190, Te-Hsing E. Rd., Taipei (TW)

( * ) Notice: Subject to any disclaimer, the term of this patent is extended or adjusted under 35 U.S.C. 154(b) by 0 days.

(21) Appl. No.: 09/640,591

(22) Filed: Aug. 18, 2000

(51) Int. Cl.$^7$ ...................................................... H02J 7/00
(52) U.S. Cl. .......................................... 320/105; 320/103
(58) Field of Search ..................................... 320/105, 107, 320/103; 324/426, 429

(56) References Cited

U.S. PATENT DOCUMENTS

| | | | |
|---|---|---|---|
| 5,194,799 | * | 3/1993 | Tomantschger ....................... 320/103 |
| 5,230,637 | * | 7/1993 | Weber ................................... 320/105 |
| 5,796,255 | * | 8/1998 | McGowan ............................. 324/429 |

\* cited by examiner

*Primary Examiner*—Peter S. Wong
*Assistant Examiner*—Lawrence Luk
(74) *Attorney, Agent, or Firm*—Bacon & Thomas PLLC

(57) ABSTRACT

An intelligent car battery-charging cable device adapted to provide electrical connections between a first battery and a second battery. The device includes a power controller that regulates power through the device, power cables that connect the power controller to the terminals of the batteries. A triggering device detects proper connection between the power cables and the terminals of the first and second batteries, upon which the triggering device generates a triggering current to activate the relay closing device to close the normally open switch of the relay closing device to close the circuits between the terminals of the first and second batteries. The triggering device is unable to activate the relay closing device and the circuits between the terminals of the first and second batteries, unless the two circuits connected to each of the power cables are both connected to the terminals of the first and second batteries.

16 Claims, 6 Drawing Sheets

INTELLIGENT CAR BATTERY-CHARGING CABLE DEVICE

BACKGROUND OF THE INVENTION

1. Field of the Invention

The present invention relates to an intelligent car battery-charging cable device, and more particularly to an intelligent car battery-charging cable device including multiple groups of circuits which are connected to indicate the powered on state and achieve an idlenessproof effect. The charging cable device further includes an cooperative protection device for ensuring triggering so that the charging cable device has an intelligent idlenessproof protection function. Only when all the positive and negative electrodes of both the normal ends and failing power end are correctly connected, the circuit between the normal and failing power ends is closed for charging operation. In case of incorrect connection, the circuit between the normal end and failing power ends remains open so as to avoid short circuit and a warning signal indicating the incorrect connection is emitted for a user to remove the incorrect connection.

2. Description of the Related Art

FIG. 1 shows the conventional power cables for connecting the battery of a car to an external power supply. Two ends of two parallel cables 5 are respectively equipped with clips 51, 52, 53, 54. The two clips 51, 52 on one side of the two cables 5 are used to respectively clip two electrodes of the external normal power supply, while the two clips 53, 54 on the other side of the two cables 5 are used to respectively and correspondingly clip the positive and negative electrode of the failing battery for charging the battery. By such measure, the correct connection positions are not clearly indicated. Therefore, in the case that the application environment lacks sufficient illumination or the user is not fully aware of electrical properties, frequently the positive and negative electrodes are reversely connected to cause damage to the normal circuit system.

FIG. 2 shows a prior DC power connecting cable device of the applicant. The DC power connecting cable device has a function of idlenessproof indication for eliminating the problem of the conventional power cables. A light emitting diode (LED) 61 is forwardly connected between the positive and negative power cables 5. The clips at the normal power end are used to clip the positive and negative electrodes of the normal power source, whereby the LED 61 has a forward bias and emits light so as to indicate the correct clipping state of the cable clips at the normal power end. In addition, at the normal power end, another LED 62 is serially connected with a test conductive plate 7. When the test conductive plate 7 contacts with the negative electrode of the failing power source, a forward bias is produced to make the LED 62 emit light so as to detect the negative electrode of the failing power end. Therefore, the incorrect connection of the positive and negative terminals of the power cables can be avoided. Such structure can achieve an idlenessproof function. However, the operation of such device is troublesome and the device lacks protective design for avoiding damage caused by an incorrect connection. In order to eliminate the shortcoming of such device, the applicant developed an improved device as shown in FIG. 3. In the improved device, a breaker (not shown) is disposed between the normal and failing power ends of the positive and negative power cables 5. Two LEDs 63, 64 on two sides of the breaker are forwardly connected with the positive and negative electrodes of two ends, whereby the LED on one side can have forward bias to emit light for indicating the correct clipping state of the cable clips at the normal power end, while the LED on the other side can emit light to indicate the correct clipping state of the cable clips at the failing power end. In case of incorrect connection at the failing power end, the breaker can open the circuit of the power cables at the normal and failing power ends so as to protect the power sources from being damaged due to incorrect connection. In addition, a buzzer 8 is backward connected between the positive and negative power cables at the failing power end for emitting a warning sound in the case of incorrect connection at the failing power end. Such device provides a protection function and a warning function. However, all the above power cable devices have normally closed current circuits. The two types of connection circuits of FIGS. 1 and 2 cannot provide any protection in case of incorrect connection. This may lead to short circuit and damage the power sources at two ends. The improved device of FIG. 3 has a breaker for opening the circuit in case of short circuit so as to protect the power sources and activate an alarm to emit warning sound. However, the improved device can cut off the current only when detecting the short circuit so as to minimize the damage of the power sources at two ends. This still pertains to a passive protection circuit so that the power sources at two ends will still be affected by the instantaneous short circuit. Furthermore, in case that the breaker is damaged or malfunctions, the straight short circuit or poor contact may even seriously damage the power sources at two ends.

SUMMARY OF THE INVENTION

It is therefore a primary object of the present invention to provide an intelligent car battery-charging cable device including two positive power cables and two negative power cables for normal power end and failing power end and positive and negative connecting clips respectively disposed at the ends of the positive power cables and negative power cables. A protection device is connected between the positive and negative power cables of the normal and failing power ends. When all the connecting clips at both the normal and failing power ends are correctly connected, the powered on state is shown. In case of incorrect connection, a warning signal is emitted. A relay closing device is disposed in the circuit. A triggering device serves to generate a triggering signal to the relay closing device for closing the circuit between the normal and failing power ends for charging operation. The triggering device is connected between the positive and negative electrodes of the normal and failing power ends and only when all the positive and negative electrodes of the normal and failing power ends are correctly connected, the triggering device emits a triggering signal to make the relay closing device close the circuit. Therefore, the circuit is intelligently protected from damage caused by short circuit due to misconnection.

It is a further object of the present invention to provide the above intelligent car battery-charging cable device in which a one-way conductive light emitting element is forwardly connected between the triggering device and the relay closing device. When the two devices are forwardly powered on, the one-way conductive light emitting element emits light for indicating the correct connection.

The present invention can be best understood through the following description and accompanying drawings wherein:

DETAILED DESCRIPTION OF THE PREFERRED EMBODIMENTS

Figure 1:
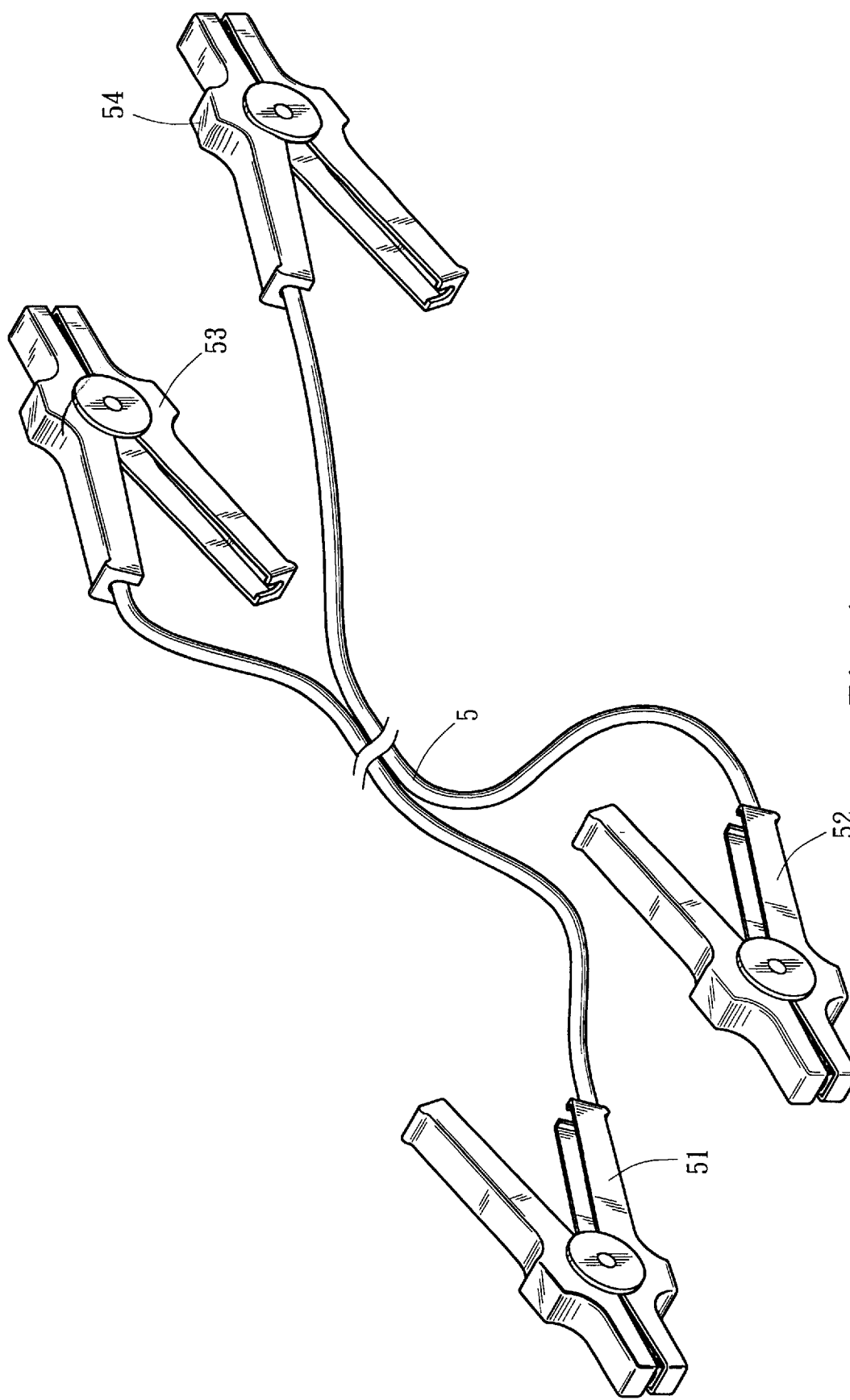
FIG. 1 is a perspective view of a conventional car battery-charging cable device.
Figure 2:
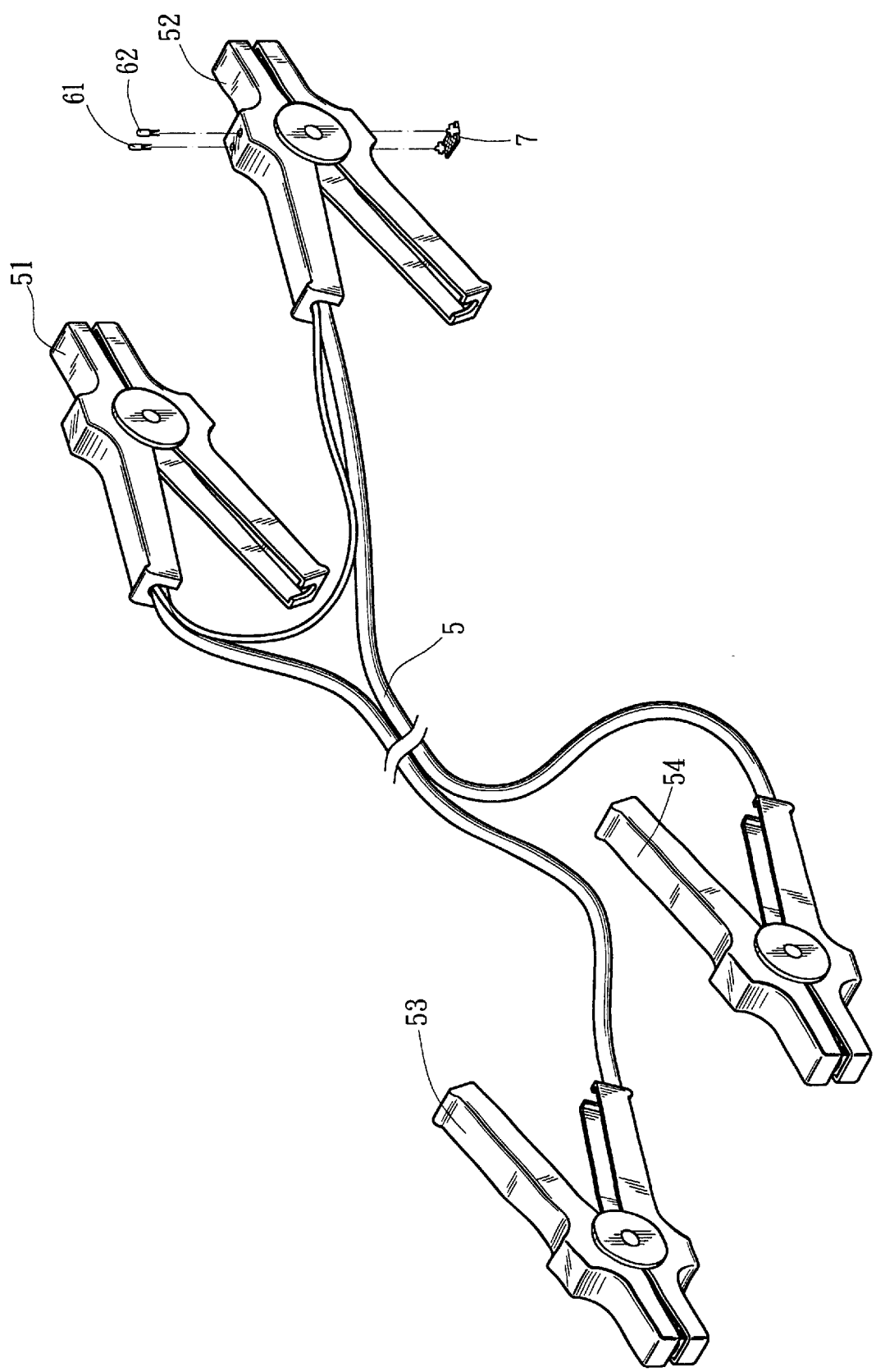
FIG. 2 is a perspective view of a prior car battery-charging cable device.
Figure 3:
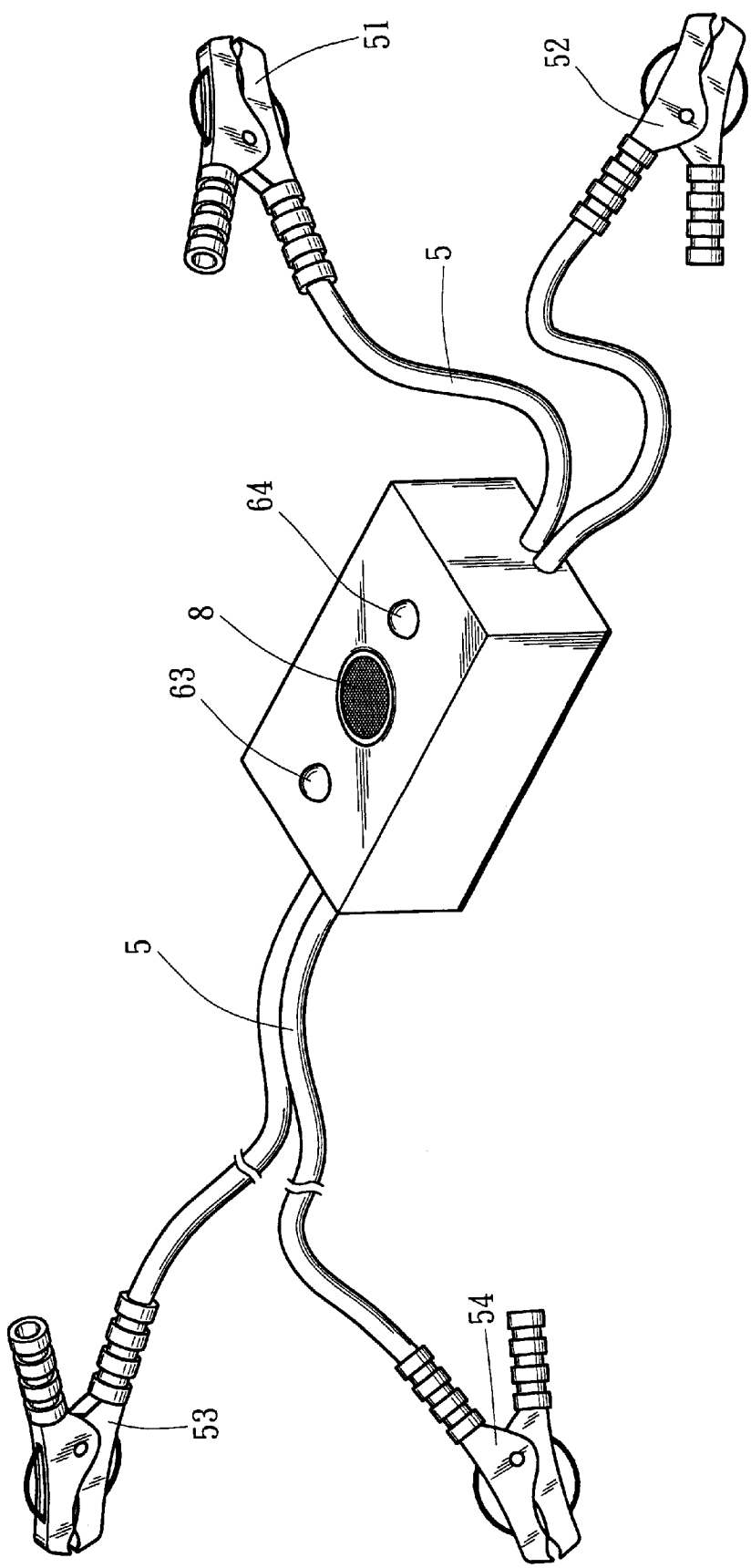
FIG. 3 is a perspective view of an improved prior car battery-charging cable device.
Figure 4:
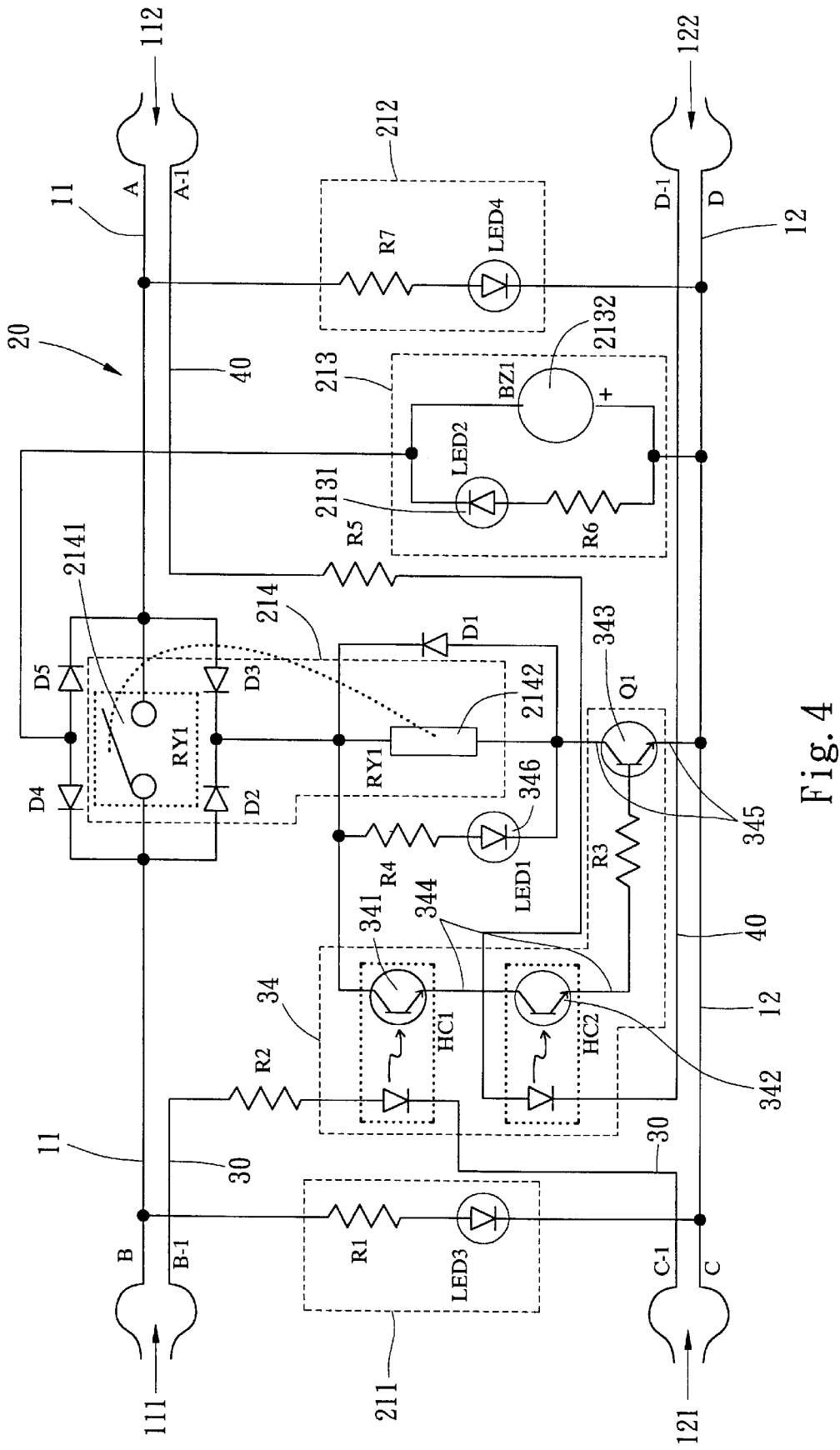
FIG. 4 is a circuit diagram of the present invention.
Figure 5:
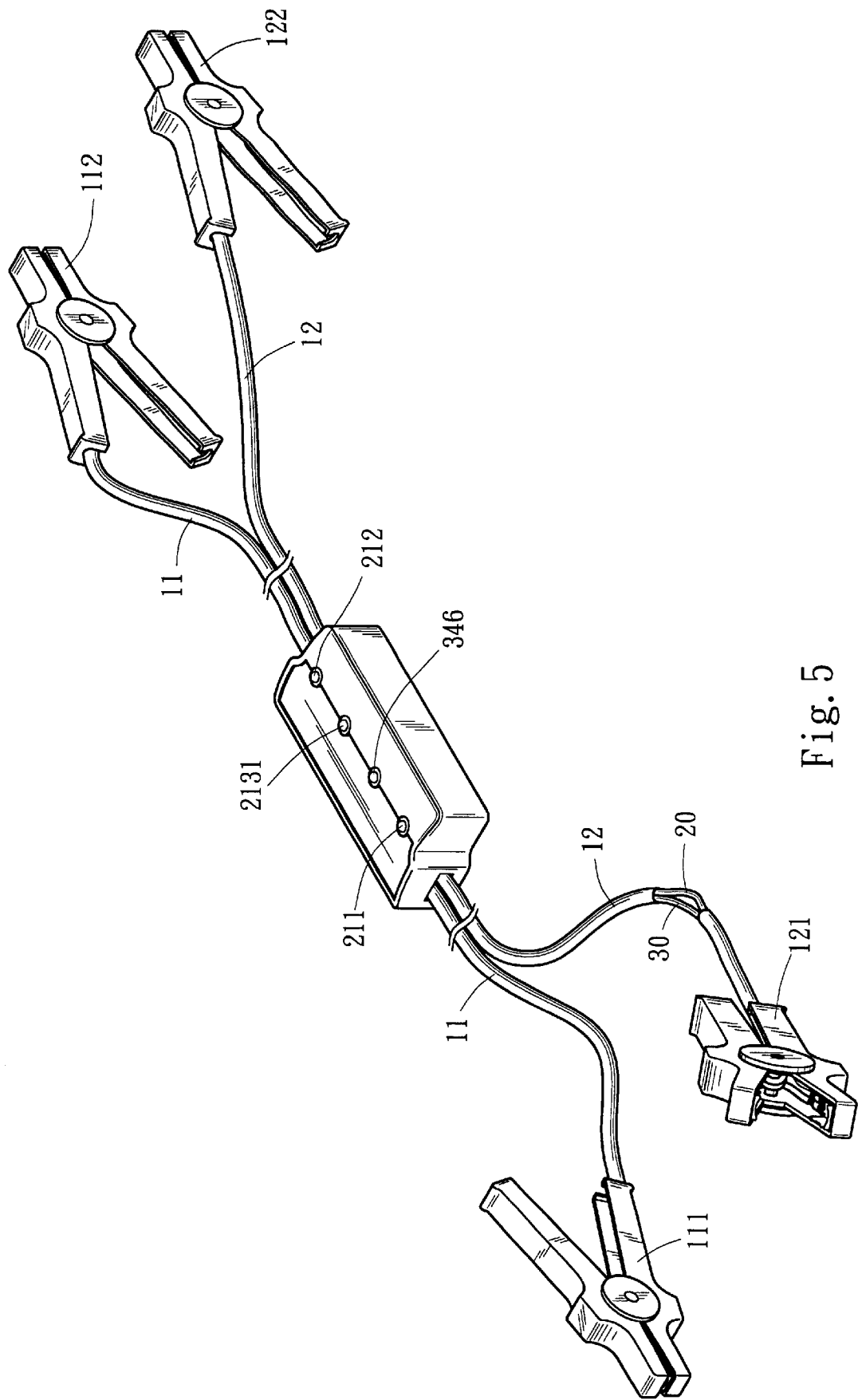
FIG. 5 is a perspective view of the present invention.

Please refer to FIGS. 4 and 5. The intelligent car battery-charging cable device of the present invention includes positive power cables 11 and negative power cables 12, for normal power end and failing power end, and normal end connecting clips 111, 121 and failing end connecting clips 112, 122 respectively disposed at the ends of the positive power cables 11 and negative power cables 12. Each of the power cables are connected to at least two circuits, for example, circuits 20 and 30 connected to clip 121 as shown in FIGS. 4 and 5. The connecting clips serve to clip the positive and negative electrodes of the normal and failing power sources such as batteries. In addition, multiple groups of circuits (such as 20, 30, 40 shown in FIG. 4) are combined between the above power cables 11, 12. The main circuit 20 is connected between the normal end connecting clips 111, 121 and failing end connecting clips 112, 122. An indicating protection device is installed in the circuit 20. The indicating protection device is composed of a normal end indicating unit 211, a failing end indicating unit 212, a warning unit 213 and a relay closing unit 214. Each of the normal end indicating unit 211 and the failing end indicating unit 212 is composed of a voltage drop element (resistor as shown in FIG. 4) and a one-way conductive light emitting element (light emitting diode as shown in FIG. 4).

Figure 6:
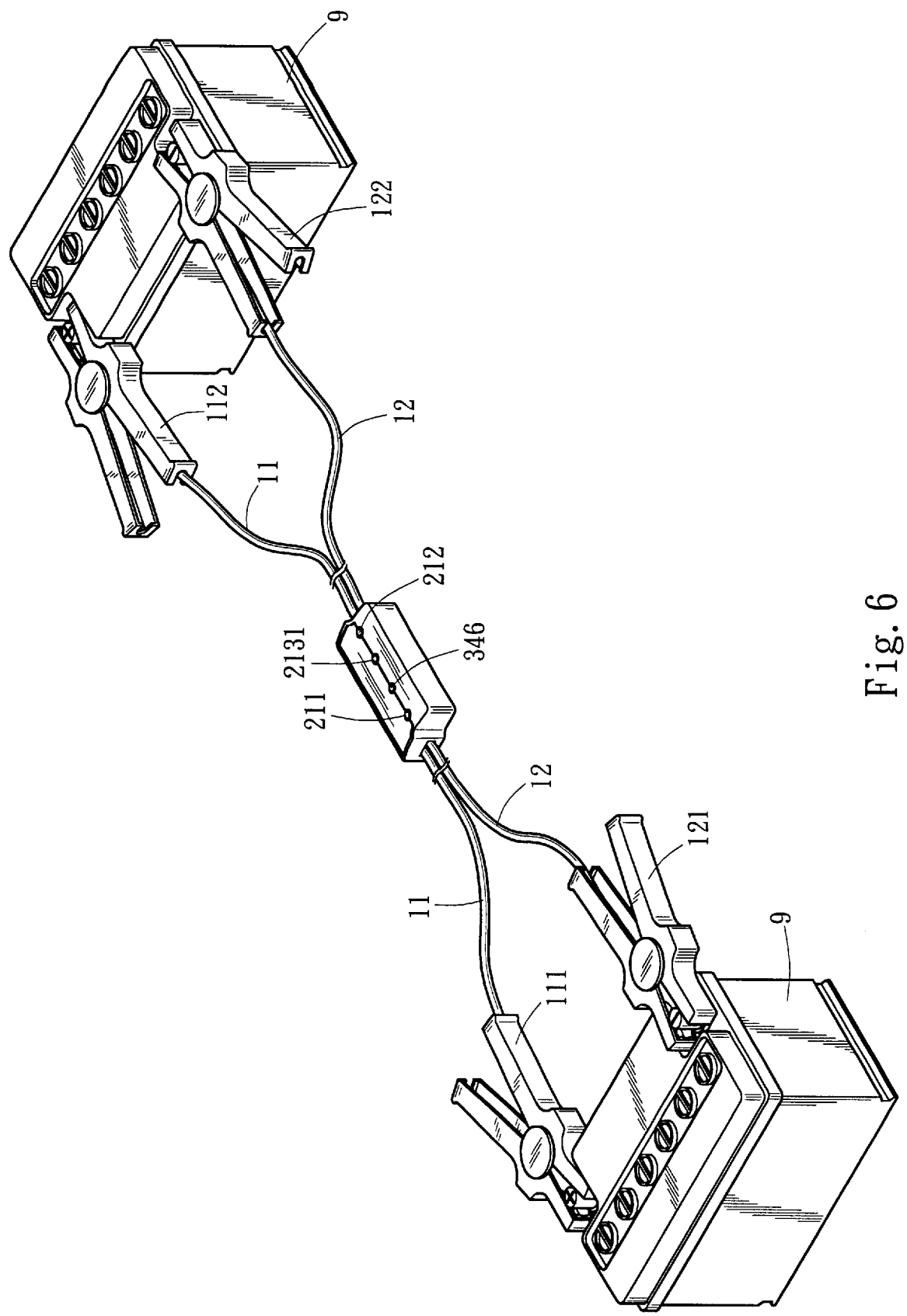
FIG. 6 shows an application of the present invention.

The resistor and light emitting diode are forwardly connected between the positive and negative power cables of the normal power end and the failing power end. When the normal end connecting clips 111, 121 or failing end connecting clips 112, 122 are correctly connected with the positive and negative electrodes of the power source (such as the battery 9 shown in FIG. 6), the light emitting is powered on to emit light so as to indicate the correct connection of the normal end connecting clips 111, 121 or failing end connecting clips 112, 122. Conversely, in case of incorrect connection of the normal end connecting clips 111, 121 or failing end connecting clips 112, 122, the one-way conductive light emitting element makes it impossible to close the circuit so that the light emitting element will not be powered on to emit light.

The warning unit 213 is backward connected between the positive and negative power cables of the failing end indicating unit 212. The warning unit 213 is composed of a voltage drop element backward serially connected with a one-way conductive light emitting element 2131 and a parallel buzzer 2132. In the case of backward connection of the failing power end, the warning unit 213 is powered on to indicate the backward connection and emit a warning sound. When the normal end connecting clips 111, 121 or failing end connecting clips 112, 122 are reversely connected with the power source, the above two indicating units 211, 212 cannot emit light to indicate the correct connection as well as the warning unit 213 will accept the misconnected power to form a backward powered on state.

The light emitting unit 2131 of the warning unit 213 at this time emits a warning light and the buzzer 2132 emits a warning sound. The relay closing unit 214 is bridged between the positive and negative powers of the normal and failing power ends. A normally open switch 2141 controlled by a relay element 2142 serves to relay close the circuit between the normal end and failing end. The normally open switch 2141 is installed between the positive power cables 11 of the normal and failing ends and is kept open in normal state. The relay element 2142 is connected with the normally open switch 2141 and a triggering device 34. When the triggering device 34 receives a current signal of correct clipping of the connecting clips 111, 121, 112, 122 of the normal end and failing end, the triggering device 34 generates a triggering current to activate the relay closing device 214 to close the normally open switch 2141 so as to close the circuit between the normal end and failing end for charging. Reversely, in case of misconnection of any of the connecting clips, the triggering device 34 cannot generate the triggering current to activate the relay closing device 214 to close the normally open switch 2141. Therefore, the circuit between the normal end and failing end remains open.

The triggering device 34 is composed of two detective triggering elements 341, 342 (photocoupling transistors as shown in FIG. 4) and a closing triggering element 343 (transistor as shown in FIG. 4). The detective triggering elements 341, 342 are respectively connected with the forward closing circuits 30, 40 between the positive and negative connecting clips 111, 121, 112, 122 connected to the normal end or failing end to be forward closed and triggered by the forward closing circuits 30, 40. The triggered closing circuit 344 of the two detective triggering elements 341, 342 is kept connected with the triggering contact point of the closing triggering element 343. The triggered closing circuit 345 of the closing triggering elements 343 is connected with the triggering circuit of the relay closing device 214. Accordingly, After the positive and negative connecting clips 111, 121, 112, 122 of the normal end and failing end are all correctly connected, the two forward closing circuits 30, 40 both have forward closing current so that the two detective triggering elements 341, 342 of the triggering device 34 respectively trigger and close the above triggered closing circuit 344. The closing current signal is transmitted to the triggering contact point of the closing triggering element 343 to trigger and close the triggered closing circuit 345 thereof. An activating current is generated to the relay closing device 214 so as to trigger and close the normally open switch 2141 and close the entire charging circuit. Reversely, in case of incorrect clipping of any of the connecting clips, at least one group of the two detective triggering elements 341, 342 of the triggering device 34 is not forward powered on so that no current passes through the triggering closing circuit 344 and the closing triggering element 343 is unable to trigger and close the triggering circuit of the relay closing device 214. Therefore, the normally open switch 2141 is open and the charging circuit between the positive electrodes of the normal end and the failing end is open. Therefore, the damage of power sources caused by short circuit due to incorrect connection can be avoided.

Furthermore, it is known from the aforesaid that there are three groups of circuits combined between the power cables 11, 12, in which the main circuit 20 having indicating protection device is connected between the positive and negative connecting clips 111, 121, 112, 122 of the normal end and failing end. The other two forward closing circuits 30, 40 are respectively connected to the two detective triggering elements 341, 342 of the triggering device 34. One circuit 30 is forwardly connected between the positive and negative connecting clips 111, 121 at the normal power end, while the other circuit 40 is connected between the positive and negative connecting clips 112, 122 at the failing end. According to the above arrangement, the two power cables 11, 12 at each connecting end have double wires which are combined together (referring to FIG. 5).

In addition, a power on indicating unit 346 is forwardly connected between the relay closing device 214 and the triggering device 34. The power on indicating unit 346 is composed of a voltage drop element and a one-way conductive light emitting element which are serially connected. When the triggering device 34 triggers the relay closing device 214, the one-way conductive light emitting element is forwardly powered on to emit light for indicating a user of the powered on state.

In use, the normal end connecting clips 111, 121 of the positive and negative power cables 11, 12 are used to clip the positive and negative electrodes of the normal power source (such as a good battery or a DC output terminal of a rectifier). In the case of correct clipping, the indicating protection device between the positive and negative power cables 11, 12 under a forward bias will forwardly power on the light emitting element of the normal end indicating unit 211 to emit light for indicating the correct connection at the normal end. At the same time, the other forward closing circuit 30 between the positive and negative electrodes of the normal power is forwardly powered on to power on the detective triggering element 341. However, in case of incorrect connection of the positive and negative connecting clips 111, 121 of the normal end, the one-way conductive element connected with the normal end indicating unit 211 and the detective triggering element 341 which is under backward bias will not emit light or be triggered. At this time, the light emitting diode 2131 and buzzer 2132 of the warning unit 213 of the main circuit 20 will be activated by the misconnected power source to emit light and warning sound. The connection of the failing end is similar to the above. The triggering device 34 cannot be triggered due to the above situation so that the relay device 214 also cannot be powered on so that the device is intelligently protected from being damaged caused by short circuit due to misconnection. Only after the positive and negative electrodes of the normal and failing power ends are correctly connected, the triggering device 34 will trigger and activate the relay device 214 to close the normally open switch 2141. At this time, the circuits 20, 30 and 40 combined in the power cables 11, 12 are closed to electrically connect the two power ends for charging operation.

The above embodiments are only used to illustrate the present invention, not intended to limit the scope thereof. Many modifications of the above embodiments can be made without departing from the spirit of the present invention.

What is claimed is:

1. An intelligent car battery-charging cable device adapted to provide electrical connections such that a first battery charges a second battery, the device comprising:

a power controller for regulating power in the device;

a first positive power cable is attached to the power controller and comprises a pair of cables each connected to a connection clip for connecting to a positive terminal of the first battery, the connection clip of the first positive power cable, upon connection to the positive terminal of the first battery, is connected to at least two circuits of the power controller;

a first negative power cable is attached to the power controller and comprises a pair of cables each connected to a connection clip for connecting to a negative terminal of the first battery, the connection clip of the first negative power cable, upon connection to the negative terminal of the first battery, is connected to at least two circuits of the power controller;

a second positive power cable is attached to the power controller and comprises a pair of cables each connected to a connection clip for connecting to a positive terminal of the second battery, the connection clip of the second positive power cable, upon connection to the positive terminal of the second battery, is connected to at least two circuits of the power controller;

a second negative power cable is attached to the power controller and comprises a pair of cables each connected to a connection clip for connecting to a negative terminal of the second battery, the connection clip of the second negative power cable, upon connection to the negative terminal of the second battery, is connected to at least two circuits of the power controller;

the power controller comprising a relay closing device bridged between the positive and negative electrodes of the first and the second batteries, the relay closing device comprising a normally open switch and a relay element; and a triggering device that detects proper connection between the power cables and the terminals of the first and second batteries, upon which the triggering device generates a triggering current to activate the relay closing device to close normally the open switch of the relay closing device closing the circuits between the terminals of the first and second batteries, and when the connection between the power cables and the terminals of the first and second batteries are improper, the triggering device is unable to activate the relay closing device and the circuits between the terminals of the first and second batteries remain open in order to protect the circuits from being damaged due to any improper connection between the power cables and the terminals of the first and second batteries; and the triggering device is unable to activate the relay closing device and the circuits between the terminals of the first and second batteries unless the two circuits connected to each of the power cables are both connected to one of the terminals of the first and second batteries.

2. The intelligent car battery-charging cable device as claimed in claim 1, wherein indicating units are each forwardly connected between the positive and the negative power cables connected to the terminals of the first and second battery.

3. The intelligent car battery-charging cable device as claimed in claim 1, wherein a warning unit is connected between the second positive power cable and the second negative power cable, and the warning unit being activated by a backward bias.

4. The intelligent car battery-charging cable device as claimed in claim 2, wherein a warning unit is connected between the second positive power cable and the second negative power cable, and the warning unit being activated by backward bias.

5. The intelligent car battery-charging cable device as claimed in claim 3, wherein the warning unit includes a displaying section comprising a voltage drop element and a one-way conductive light emitting element which are serially connected.

6. The intelligent car battery-charging cable device as claimed in claim 4, wherein the warning unit includes a displaying section comprising a voltage drop element and a one-way conductive light emitting element which are serially connected.

7. The intelligent car battery-charging cable device as claimed in claim 5, wherein the warning unit includes an alarm section comprising a buzzer.

8. The intelligent car battery-charging cable device as claimed in claim 6, wherein the warning unit includes an alarm section comprising a buzzer.

9. The intelligent car battery-charging cable device as claimed in claim 1, wherein the relay closing device and the relay element are connected with each other, the normally open switch is installed between the positive power cables, such that when the relay closing device is triggered by the triggering device, the normally open switch is closed to close the circuit.

10. The intelligent car battery-charging cable device as claimed in claim 1, wherein the triggering device comprises two detective triggering elements and a closing triggering element;

a voltage drop element and a one-way conductive element being serially connected and respectively connected between the clips of the positive and negative power cables to form forward closing circuits, the forward closing circuits serving to respectively close and control the two detective triggering elements, a triggered closing circuit of the two detective triggering elements being connected with a triggering contact point of the closing triggering element, the triggered closing circuit of the closing triggering elements being connected with a triggering circuit of the relay closing device, whereby after the clips of the positive and negative power cables are all correctly connected to the terminals of the two batteries, the two detective triggering elements are respectively triggered to close by a forward closing current so that the triggering closing element generates an activating current to the relay closing device to trigger and close the circuit of the normally open switch.

11. The intelligent car battery-charging cable as claimed in claim 1, wherein a power-on indicating unit is disposed between the relay closing device and the triggering device, whereby when the relay closing device is triggered and activated, and the power-on indicating unit emits light to indicate a charging state of the device.

12. The intelligent car battery-charging cable device as claimed in claim 10, wherein a power-on indicating unit is disposed between the relay closing device and the triggering device, whereby when the relay closing device is triggered and activated, and the power-on indicating unit emits light to indicate a charging state of the device.

13. The intelligent car battery-charging cable device as claimed in claim 11, wherein a power-on indicating unit is disposed between the relay closing device and the triggering device, whereby when the relay closing device is triggered and activated, and the power-on indicating unit emits light to indicate a charging state of the device.

14. The intelligent car battery-charging cable device as claimed in claim 12, wherein the power-on indicating unit comprises a voltage drop element and a one-way conductive light emitting element which are serially connected.

15. The intelligent car battery-charging cable device as claimed in claim 13, wherein the power-on indicating unit comprises a voltage drop element and a one-way conductive light emitting element which are serially connected.

16. The intelligent car battery-charging cable device is claimed in claim 11, wherein the power-on indicating unit comprises a voltage drop element and a one-way conductive light emitting element which are serially connected.

* * * * *